July 16, 1968

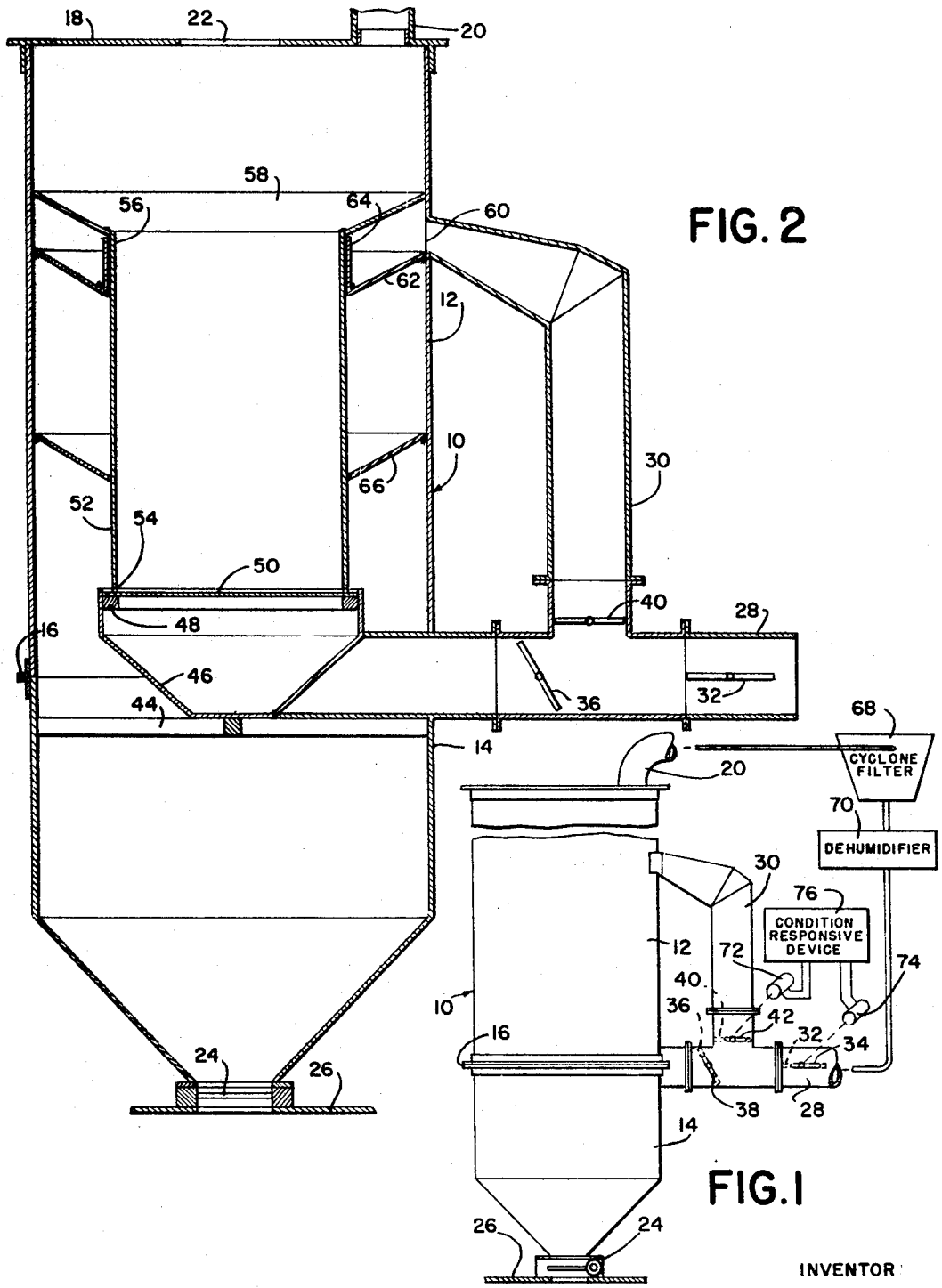

United States Patent Office 3,392,456
Patented July 16, 1968

3,392,456
APPARATUS FOR MODIFYING THE FLUID
CONTENT OF PARTICULATE MATERIAL
Dewey Rainville, 11 Kent Place,
Westfield, N.J. 07090
Filed Dec. 22, 1965, Ser. No. 515,660
10 Claims. (Cl. 34—56)

ABSTRACT OF THE DISCLOSURE

Apparatus for drying powdered materials by the use of heated and dehumidified air wherein the drying fluid is directed upwardly through a movable container charged with the material to be dried. When the desired condition of the material is achieved, the drying fluid is redirected so as to cause the container to be raised thereby releasing its contents.

---

This invention relates to apparatus for modifying the fluid content of particulate material and is eminently suited for the drying of powdered plastic materials, prior to their extrusion, by the use of heated and dehumidified air.

By virtue of the present invention, the material whose fluid content is being modified can be deposited into a hopper after the desired condition has been achieved, and then from the hopper to another station without coming into contact with the atmosphere or other media that would be apt to change the fluid content of the material.

It is among the objects of the present invention to provide apparatus for modifying the fluid content of particulate material comprising a frame, a fluid pervious screen supported by the frame, a tubular container for particulate material having a substantially vertical axis and supported by the frame for movement in the direction of the axis, the container having upper and lower ends providing openings, the container having a lower position in which the screen covers the opening at the lower end and an elevated position in which the lower end opening is spaced from the screen for the discharge of material from the container, a duct for supplying modifying fluid through the screen to the container, and means for elevating the container relative to the screen. In its preferred form, the apparatus includes a housing closed to atmosphere and enclosing the container. The elevating means is preferably fluid actuated by means of fluid provided by the duct that supplies the modifying fluid. The elevating means may include a piston carried by the container for reciprocation within the housing which serves as a cylinder. A hopper is preferably disposed below the screen to receive material discharged from the container. The flow of fluid from the duct to the piston carried by the container is preferably controlled by suitable valve means. The upper end of the container is preferably provided with an upwardly divergent flange. The frame preferably supports a plenum intermediate the duct and screen. The valve means for controlling the flow of fluid may include one or more motors which are in turn suitably controlled to actuate the valve means at appropriate times.

A more complete understanding of the invention will follow from a description of the accompanying drawings wherein:

FIG. 1 is a side elevation of the apparatus along with a schematic portrayal of other components of a system; and FIG. 2 is a sectional elevation of a portion of the apparatus depicted in FIG. 1.

A frame comprising housing 10 which includes an upper shell 12 secured to a lower shell or hopper section 14 by means of flanges 16. The upper end of the upper shell 12 receives a closure 18 to which is fitted an exhaust duct 20 and which contains a loading opening 22 which will be suitably closed to atmosphere after a load of material to be treated has been introduced. Discharge from the lower end of the hopper section 14 is controlled by a valve 24 of any suitable type, and the entire assembly may be mounted on a supporting plate 26.

A supply duct 28 is provided for the introduction of treating fluid to the interior of the housing 10 and for supplying fluid through a branch duct 30 for imparting vertical movement to a container within the housing, in a fashion to be described in more detail.

The supply duct 28 contains a main valve 32 which can be actuated manually by means of a handle 34. Beyond the branch duct 30, the supply duct 28 contains another valve 36, adjustable by means of a handle 38 to regulate the flow of treating fluid admitted to the housing 10. The branch duct 30 also contains a valve 40, capable of manual manipulation by means of a handle 42, to regulate the admission of fluid for elevating a container within the housing.

Within the lower shell or hopper section 14, a spider 44 is mounted for supporting a plenum 46. Plenum 46 is supplied with fluid from the duct 28 and has adjacent its upper end, an annulus 48 for supporting a porous plate or screen 50.

A container 52 for particulate material to be treated is movable along its vertical axis from a position in which its open lower end 54 rests upon the porous plate or screen 50 to an elevated position in which the open lower end 54 is spaced from the porous plate or screen 50 so that treated material can be discharged from the container and flow into the hopper section 14 for discharge to the next operation.

At the open upper end 56 of the container 52 there is provided an upwardly divergent flange 58 which serves as a piston which moves within the inner wall of the housing upper shell 12 under the influence of fluid supplied from the duct 28 through the branch duct 30. Immediately below the opening 60 in the upper shell 12 where it is penetrated by the branch duct 30, a downwardly convergent flange 62 is attached to the upper shell, and this flange 62 is terminated by a sleeve 64 extending axially towards the upper end of the container 52. Intermediate the length of the container 52, in its position depicted in FIG. 2, another downwardly convergent flange 66 is secured to the inner wall of the upper shell 12 to serve as a guide for the container 52 as it moves in its axial path.

In its use for drying powdered plastic materials prior to extrusion, the apparatus of the present invention will be charged through the loading opening 22 formed in the closure 18 until a desired predetermined quantity of the powder has been received within the container 52 and supported on the porous plate or screen 50. Hot dehumidified air will be admitted past the open valve 32 in the duct 28 and through the opening provided by the preadjusted valve 36 into the plenum 46, through the porous plate or screen 50, through the material to be dried in the container 52 and discharged through the exhaust duct 20. When the desired condition of the material undergoing treatment has been achieved, the valve 40 in the branch duct 30 will be opened to admit fluid from the duct 28 into the chamber defined by the flange or piston 58 carried by the container 52 and the flange 62 and sleeve 64 secured to the inner wall of the upper shell 12. This fluid will act on the piston 58 to elevate the container 52 until its open lower end 54 is raised above the porous plate or screen 50 sufficiently to permit the material within the container to be discharged into the hopper section 14. Then, the valve 40 in the branch duct 30 will be returned to its closed position and the main valve 32 in the duct 28 will be closed. Under these conditions, the container 52 will move under the influence of gravity to its lowered position ready to receive another charge of material to undergo treatment, whereupon the valve 32 will be reopened.

Fluid delivered from the exhaust duct 20 can be carried to a cyclone filter 68, as schematically illustrated in FIG. 1, from which it will enter a dehumidifier 70 for removal of excess moisture and the addition of heat for renewed use in the drying operation. It is contemplated that the valve 42 be actuated by a servo motor 72 and the valve 32 by a servo motor 74 under the control of a condition responsive device 76 which can be actuated by time, humidity, pressure, or any other condition desired for cycling the operation of the apparatus.

Whereas only one form of the invention has been described with reference to the accompanying drawings, many variations will suggest themselves to those skilled in the art and such variations are contemplated as falling within the scope of the appended claims.

I claim:

1. Apparatus for modifying the fluid content of particulate material comprising a frame, a fluid pervious screen supported by said frame, a tubular container for particulate material having a substantially vertical axis and supported by said frame for movement in the direction of said axis, said container having upper and lower ends providing openings, said container having a lower position in which said screen covers the opening at said lower end and an elevated position in which said lower end opening is spaced from said screen for the discharge of material from said container, a duct for supplying modifying fluid through said screen to said container, and means for elevating said container relative to said screen.

2. Apparatus according to claim 1 wherein said frame includes a housing closed to atmosphere enclosing said container.

3. Apparatus according to claim 1 wherein said elevating means is fluid actuated.

4. Apparatus according to claim 1 wherein said duct supplies fluid for actuating said elevating means.

5. Apparatus according to claim 1 wherein said elevating means includes a piston carried by said container.

6. Apparatus according to claim 1 wherein a hopper is disposed below said screen to receive material discharged from said container.

7. Apparatus according to claim 1 wherein said elevating means includes a piston carried by said container adapted to receive fluid from said duct, and valve means for controlling the flow of fluid from said duct to said piston.

8. Apparatus according to claim 1 wherein said container is provided with an upwardly divergent flange at its upper end.

9. Apparatus according to claim 1 wherein said frame supports a planum intermediate said duct and screen.

10. Apparatus according to claim 1 wherein said elevating means comprises a motor.

References Cited

UNITED STATES PATENTS

| | | | |
|---|---|---|---|
| 526,101 | 9/1894 | Drake | 34—104 |
| 2,305,724 | 12/1942 | Luetzelschwab | 222—504 |
| 2,969,038 | 1/1961 | Neumann | 34—57 X |
| 3,085,351 | 4/1963 | Hurst | 34—229 |

FOREIGN PATENTS

| | | |
|---|---|---|
| 979,120 | 12/1950 | France. |
| 1,006,824 | 4/1957 | Germany. |
| 1,018,544 | 1/1966 | Great Britain. |

FREDERICK L. MATTESON, Jr., *Primary Examiner.*

A. D. HERRMANN, *Assistant Examiner.*